United States Patent
Watson et al.

(10) Patent No.: US 10,172,331 B2
(45) Date of Patent: Jan. 8, 2019

(54) AQUARIUM AND NON-DISRUPTIVE FILTRATION SYSTEM

(71) Applicant: PetSmart Home Office, Inc., Phoenix, AZ (US)

(72) Inventors: Jeffrey Stocker Watson, Phoenix, AZ (US); Gary Steven Chattin, Phoenix, AZ (US); Lisa Beilke, Phoenix, AZ (US)

(73) Assignee: PetSmart Home Office, Inc., Phoenix, AZ (US)

( * ) Notice: Subject to any disclaimer, the term of this patent is extended or adjusted under 35 U.S.C. 154(b) by 0 days.

(21) Appl. No.: 15/476,026

(22) Filed: Mar. 31, 2017

(65) Prior Publication Data
US 2018/0279589 A1   Oct. 4, 2018

(51) Int. Cl.
*A01K 63/04* (2006.01)
*C02F 1/00* (2006.01)
*B01D 29/90* (2006.01)
*A01K 63/06* (2006.01)
*A01K 63/00* (2017.01)

(52) U.S. Cl.
CPC .......... *A01K 63/045* (2013.01); *A01K 63/003* (2013.01); *A01K 63/047* (2013.01); *A01K 63/06* (2013.01); *B01D 29/902* (2013.01); *C02F 1/001* (2013.01); *C02F 2201/006* (2013.01)

(58) Field of Classification Search
CPC ............ C02F 1/325; C02F 2201/009; C02F 2303/04; C02F 2103/42; C02F 2201/006; E04H 4/1636; E04H 4/1263; E04H 4/16
USPC .............. 210/167.21, 167.22, 416.1, 416.2; 119/259
See application file for complete search history.

(56) References Cited

U.S. PATENT DOCUMENTS

| | | | | |
|---|---|---|---|---|
| 2,782,161 | A * | 2/1957 | Willinger | A01K 63/045 210/167.24 |
| 3,815,547 | A * | 6/1974 | Willinger | A01K 63/045 119/259 |
| 5,306,421 | A * | 4/1994 | Weinstein | A01K 63/045 119/248 |
| 5,626,747 | A * | 5/1997 | Ritzow | A01K 63/045 119/259 |
| 2006/0273037 | A1* | 12/2006 | Venezia | A01K 63/045 210/703 |

(Continued)

FOREIGN PATENT DOCUMENTS

FR   2614176 A1 * 10/1988

*Primary Examiner* — Fred Prince
(74) *Attorney, Agent, or Firm* — Duane Morris LLP (57) ABSTRACT

The disclosed embodiments include an aquarium having a non-disruptive filtration system. In one aspect, an apparatus includes a tank having a closed end and an open end, a lid removably positioned over the open end, and filter housing including a sidewall that, when fixedly position within the tank, encloses a first portion of the tank. Inlets in the sidewall maintain fluid communication between the first portion of the tank and a second portion of the tank. The filter housing includes a filter cartridge partitioning the enclosed first portion into a first chamber from a second chamber, a pump disposed within the second chamber, and a reservoir disposed within the second chamber at a distal end of the filter housing. The reservoir is connected to the pump across an elongated tube, and includes discharge lip across which pumped water discharges into the tank.

20 Claims, 7 Drawing Sheets

(56) References Cited

U.S. PATENT DOCUMENTS

| | | | |
|---|---|---|---|
| 2009/0255480 A1* | 10/2009 | Tsai | A01K 63/045 119/259 |
| 2011/0162585 A1* | 7/2011 | Tominaga | A01K 63/045 119/259 |
| 2012/0079991 A1* | 4/2012 | Mertz | A01K 63/003 119/264 |

* cited by examiner

AQUARIUM AND NON-DISRUPTIVE FILTRATION SYSTEM

BACKGROUND

Aquariums housing aquatic life provide an aesthetically pleasing, relaxing display of motion and color that promote a viewer's curiosity and interest. Certain aquatic life, including species of fish commonly housed in aquariums, thrive in aquatic environments characterized by minimal hydrodynamic current and fluid motion. Nonetheless, aquarium maintenance, including proper water filtration and circulation, is essential to establishing a healthy aquatic environment for these fish species. Many conventional aquarium filtration systems face challenges in balancing the demands of proper water filtration and circulation with the desired fluid-dynamic characteristics of the aquatic environment.

SUMMARY

In an embodiment, an apparatus includes a tank having a closed end and an open end and a filter housing that includes a base plate and a sidewall having inlets. In some aspects, the filter housing is disposed within an interior of the tank, and longitudinal edges of the sidewall are affixed to a surface of an interior sidewall of the tank to enclose a first portion of the tank. The apparatus also includes a filter cartridge dimensioned to be removably positioned between the sidewall and the surface of the tank sidewall. In certain aspects, the filter cartridge partitions the enclosed first portion of the tank into a first chamber and a second chamber, with the first chamber being in fluid communication with a second portion of the tank through the inlets. The apparatus further includes a pump disposed within the second chamber, and having an input in fluid communication with the second chamber, and an output connected to a proximal end of an elongated tube. A reservoir is dimensioned to be removably positioned within the second chamber, and connected to a distal end of the elongated tube and including an outlet that engages the sidewall. In additional aspects, the second portion of the tank stores water, and the pump operates to mechanically draw the water from the second tank portion into the first chamber through the inlets, and across the filter cartridge into the second chamber. The pump also operates to mechanically pump the drawn water through the elongated tube and into the reservoir, and the reservoir discharges the pumped water into the second tank portion through the outlet.

In other aspects, the base plate is affixed to an interior surface of the closed end of the tank, and the base plate is connected to the sidewall along a first lateral edge. Additionally, the outlet includes a discharge lip, and the sidewall includes a notch disposed along a second lateral edge and including a notch surface that is parallel to the base plate. In one instance, the notch is dimensioned to removably receive and support the discharge lip, a surface of which is oriented parallel to the base plate. Further, the surface of the discharge lip is disposed at a position above a surface of the water stored in the second tank portion, and the pumped water discharges across the surface of the discharge lip into the second portion of the tank.

Additionally, in some aspects, the pumped water discharges across the surface of the discharge lip at a constant flow rate. In other aspects, the pumped water discharges across the surface of the discharge lip at a flow rate of twelve gallons per hour.

In further aspects, the sidewall includes first and second filter supports, that are dimensioned to receive and support the filter cartridge, and the filter cartridge is disposed between the first and second filter supports within the first portion of the tank. The apparatus also includes elongated structures disposed along the longitudinal edges of the sidewall, which are in contact with the surface of an interior sidewall and a surface of the sidewall along the longitudinal edges, and which connect the sidewall to the interior sidewall of the tank. In certain instances, the sidewall may include a curved sidewall, a curvature of the sidewall is concave toward the surface of the interior sidewall of the tank, and the filter housing is dimensioned to removably receive and support the pump, reservoir, and elongated tube within the second chamber. The pump is, in some instances, supported by the base of the filter housing.

The apparatus also includes a plurality of tank support structures affixed to an exterior surface of the closed end of the tank, and a lid dimensioned to removably receive the open end of the tank. In some instances, the lid includes an aperture and an aperture cover, and the apparatus includes a lighting unit disposed on an interior surface of the lid. The lighting unit includes a lighting element that emits light illuminating the interior of the tank.

In other embodiments, a filtration system includes a filter housing comprising a base plate and a sidewall. The sidewall includes a plurality of inlets, and longitudinal edges of the sidewall being in contact with a surface of an interior sidewall of a tank to enclose a portion of the tank. The filtration system also includes a filter cartridge dimensioned to be removably positioned between the sidewall and the surface of the interior sidewall and partitioning the enclosed first portion into a first chamber and a second chamber, a pump disposed within the second chamber and having an input in fluid communication with the second chamber and an output connected to a proximal end of an elongated tube, and a reservoir dimensioned to be removably positioned within the second chamber. The reservoir is connected to a distal end of the elongated tube and including an outlet that engages the sidewall. In certain instances, the pump operates to mechanically draw water into the first chamber through the inlets, and across the filter cartridge into the second chamber. The pump also operates to mechanically pump the drawn water through the elongated tube and into the reservoir, and the reservoir discharges the pumped water through the outlet.

In certain aspects, the outlet includes a discharge lip, and the sidewall includes a notch disposed along a second lateral edge. The notch includes a notch surface that is parallel to the base plate, and the notch is dimensioned to removably receive and support the discharge lip. Further, a surface of the discharge lip is oriented parallel to the base plate, and the pumped water discharges across the surface of the discharge lip. Additionally, the pumped water discharges across the surface of the discharge lip at a flow rate of twelve gallons per hour.

The sidewall also includes first and second filter supports dimensioned to receive and support the filter cartridge, and the filter cartridge is disposed between the first and second filter supports. Further, the filter housing is dimensioned to removably receive and support the pump, reservoir, and elongated tube within the second chamber. The pump is, in some instances, being supported by the base of the filter housing.

In other aspects, the first chamber is in fluid communication with a second portion of the tank through the inlets, and the second portion of the tank stores water. The surface of the discharge lip is disposed at a position above a surface of the water stored in the second tank portion, and the pump operates to mechanically draw the stored water from the second tank portion into the first chamber through the inlets, and across the filter cartridge into the second chamber. The reservoir discharges the pumped water into the second tank portion through the outlet.

These and other embodiments will become apparent to one of skill in the art upon the reading and understanding of the attached figures and associated detailed description.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference aquariums and non-disruptive filtration systems, it is to be understood that the discussion is not intended to limit the scope of the present subject matter in any way and that the principles presented are equally applicable to other systems and/or methods for non-disruptive filtration and circulation within aquariums and similar aquatic habitats.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a night light aquarium are described.

Figure 1:
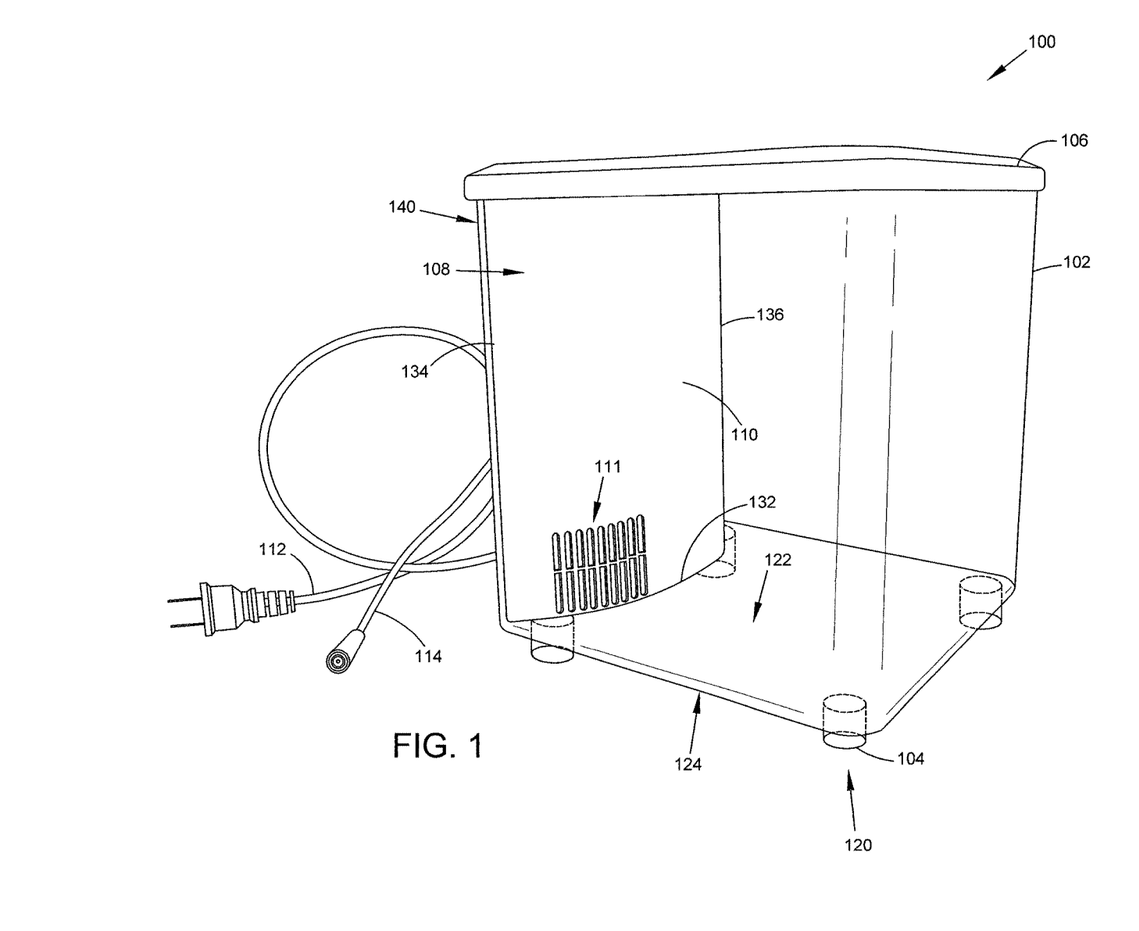
FIG. 1 is a perspective view of an aquarium, according to certain disclosed embodiments.

FIG. 1 is a perspective view of an aquarium 100, according to certain disclosed embodiments. In FIG. 1, aquarium 100 includes a tank 102, exterior supports 104, a lid 106, a filter housing 108 that includes a base plate (not depicted in FIG. 1) and a sidewall 110, and electrical connectors 112 and 114. Although not depicted in FIG. 1, lid 106 also includes an aperture, which facilitates access to an interior of the tank 102 (e.g., to add water and other fluids into the interior of tank 102, etc.), and an aperture cover, which may be disposed in an open position or a closed position.

In certain aspects, tank 102 is constructed from a transparent material that includes, but is not limited to, glass, acrylic, plastic, or other similar materials, and is shaped as a hollow rectangular prism having an open end (not depicted in FIG. 1) and a closed end 120 that establishes a bottom surface 122 of tank 102. Further, and as shown in FIG. 1, supports 104 are disposed about an exterior surface of closed end 120 (e.g., at respective corners of tank 102), and are affixed to the exterior surface of closed end 120 using an appropriate mechanical process (e.g., using mechanical fasteners, through heat welding, or through use of an adhesive compound). For example, base supports 104 and tank 102 may be constructed from a common transparent material, such as a transparent plastic material, and base supports 104 may be connected to exterior surface 124 using epoxy resin.

Although depicted in FIG. 1 and described herein as a hollow rectangular prism, tank 102 is not limited to this exemplary shape, and in other embodiments, tank 102 may be formed from other shapes (e.g., a cube, a cylinder, other polyhedrons, a frustum, a globular shape, etc.), which will necessitate similar shaping for lid 106. Further, supports 104 may be constructed from any additional or alternate transparent or opaque material (i.e., a material different from tank 102), and may be positioned at any additional or alternate location along exterior surface 124 appropriate to support tank 102 within an environment.

As described above, filter housing 108 includes the base plate and sidewall 110, and in one aspect, the base plate is connected to sidewall 110 along a first lateral edge 132. As shown in FIG. 1, filter housing 108 is disposed within an interior of tank 102, and the base plate and sidewall 110 are dimensioned such that; (i) the base plate is positioned over and attached to a portion of bottom surface 122; and (ii) longitudinal edges 134 and 136 of sidewall 110 engage and are attached to portions of an interior surface of a sidewall 140 of tank 102. In some aspects, upon attachment to the corresponding portions of bottom surface 122 and the interior surface of sidewall 140, filter housing 108 may enclose a portion of the interior of tank 102 bounded by the base plate, sidewall 110, and sidewall 140. By way of example, the baseplate and sidewall 110 may be constructed from an opaque thermoplastic material, and may be joined together, and to the corresponding portions of bottom surface 122 and the interior surface of sidewall 140, using any of the processes described herein. In other instances, the baseplate and sidewall 110 are constructed from one or more different materials, which include, but are not limited to, glasses, plastics, acrylics, and other similar materials.

Additionally, sidewall 110 includes inlets 111 that facilitate a flow of water from an interior of tank 102 through sidewall 110 and into an interior of filter housing 108 (e.g., the enclosed portion of tank 102). For example, as shown in FIG. 1, inlets 111 are positioned along first lateral edge 132 within a portion of sidewall 110 that is proximate to longitudinal edge 134, and are elongated in a direction parallel to a vertical axis of tank 102. The disclosed embodiments are not limited to these exemplary inlets and inlet orientations, and in other instances, sidewall 110 may include inlets having any additional or alternate shape (e.g., squares, circles, polygons, etc.) or orientation that would facilitate the flow of water through sidewall 110. For example, and as described below, filter housing 108 is dimensioned to removably receive a filter cartridge, a reservoir, and a mechanical pump interconnected to the reservoir through an elongated tube (not depicted in FIG. 1), which collectively function to filter and redistribute water throughout tank 102 in a manner that does not disturb fish and other aquatic life housed within aquarium 100.

Figure 2:
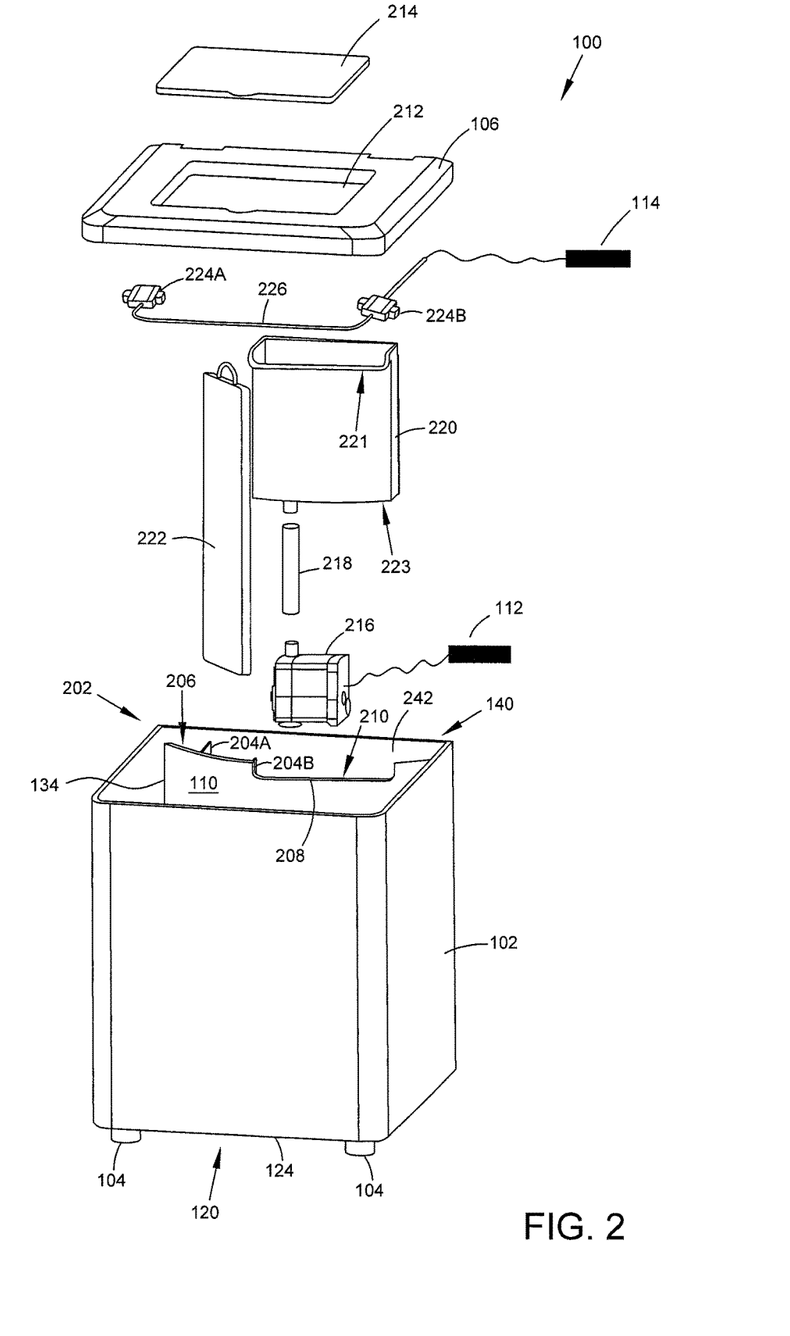
FIG. 2 is an exploded view of an aquarium illustrating a tank, a lid, a filter base, a filter housing, a pump, a reservoir, and an elongated tube connecting the pump and reservoir, in accordance with certain disclosed embodiments.

As shown in FIG. 2, tank 102 includes an open end 202, closed end 120, and external supports 104. In some aspects, filter housing 108 is positioned within an interior of tank 102 such that longitudinal edge 134 and longitudinal edge 136 (not depicted in FIG. 2) are in contact with and attached to corresponding portions of the interior surface of sidewall 140, e.g., interior surface 242 of FIG. 2. Further, and as described above, the attachment of sidewall 110 to interior surface 242 and of the base plate to bottom surface 122 (not depicted in FIG. 2) define the interior of filter housing 108 and enclose the portion of tank 102 bounded by the base plate, sidewall 110, and interior surface 242 of sidewall 140.

In certain aspects, filter housing 108 is dimensioned to removably receive the mechanical pump (e.g., pump 216 of FIG. 2, which is connected to an external power source by electrical connector 112), the elongated tube (e.g., tube 218 of FIG. 2), the reservoir (e.g., reservoir 220 of FIG. 2 having a closed end 223), and the filter cartridge (e.g., filter cartridge 222 of FIG. 2). For example, as shown in FIG. 2, sidewall 110 may include, on a surface disposed to the interior of filter housing 108, filter support structures 204A and 204B, which are collectively dimensioned to removably receive and support filter cartridge 222. Further, in FIG. 2, sidewall 110 includes a second lateral edge 206, which includes a notch 208 dimensioned to engage with and support a discharge lip 221 of reservoir 220 when reservoir 220 is removably positioned within filter housing 108. Notch 208 also includes a notch surface 210, which is oriented parallel with bottom surface 122.

Figure 3:
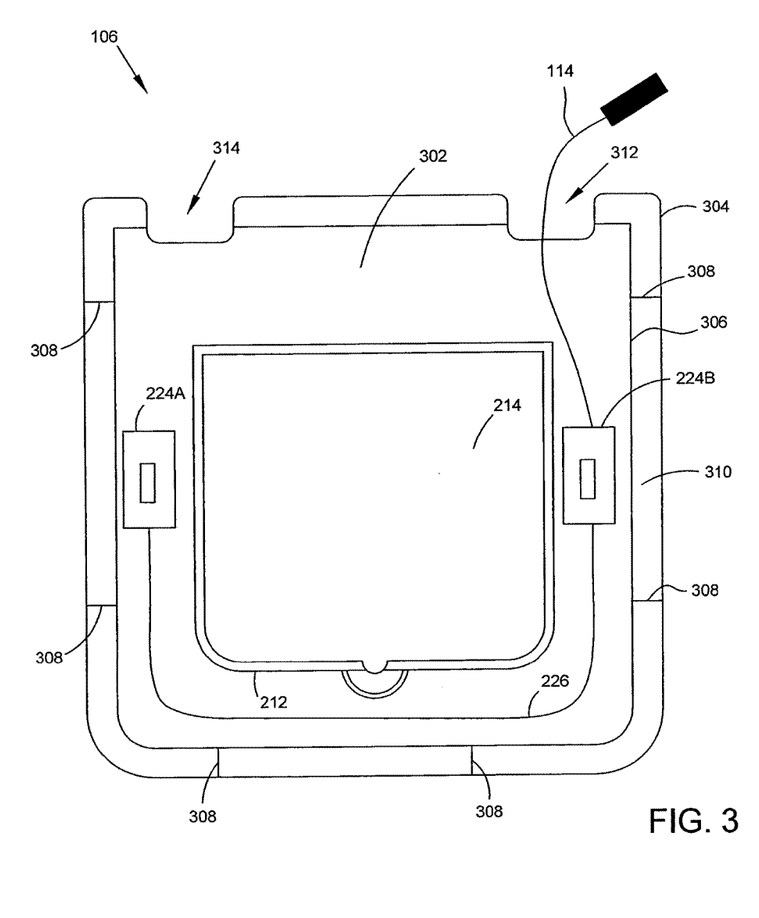
FIG. 3 is a plan view of an interior surface of a tank lid, according to certain disclosed embodiments.

Aquarium 100 includes lid 106, which includes the aperture (e.g., aperture 212 of FIG. 2), and the aperture cover (e.g., aperture cover 214 of FIG. 2). As further shown in FIG. 2, aquarium 100 includes lighting units 224A and 224B, which are interconnected by interior electrical connection 226. In some aspects, each of lighting units 224A and 224B includes a lighting element (not depicted in FIG. 2), such as, but not limited to, a light emitting diode (LED), and is disposed on an interior surface of lid 106 such that light emitted by the corresponding lighting element illuminates the interior of tank 102. FIG. 3 illustrates an exemplary disposition of lighting units 224A and 224B, and of electrical connection 226, along an interior surface 302 of lid 106 in accordance with certain disclosed embodiments. Aquarium 100 is, however, not limited to this exemplary orientation of lighting units along interior surface 302, and in other embodiments, aquarium 100 may include other lighting units and other types of lighting elements (e.g., incandescent or fluorescent lamps) disposed across interior surface 302 (or on other portions of aquarium 100) in any additional or alternate orientation.

As shown in FIG. 3, lid 106 includes an edge 304 and a lip 306 disposed on interior surface 302 and displaced from edge 304 (e.g., by a displacement of 0.5 cm, 1.0 cm, etc.). Further, a plurality of groove supports 308 are positioned at corresponding positions along a portion of interior surface 302 disposed between edge 304 and lip 306. In one aspect, and described below, edge 304, lip 306, and groove supports 308 are dimensioned to establish a grove 310 that removably receives and supports open end 202 of tank 102, and a thickness of groove 310 is established by the displacement between edge 304 and lip 306. Additionally, lid 106 includes pathways 312 and 314 formed into edge 304 and lip 306 and dimensioned to permit a passage of electrical connector 112 (not depicted in FIG. 3) and electrical connector 114 from the interior of tank 102 to the external source of electrical power.

Figure 4A:
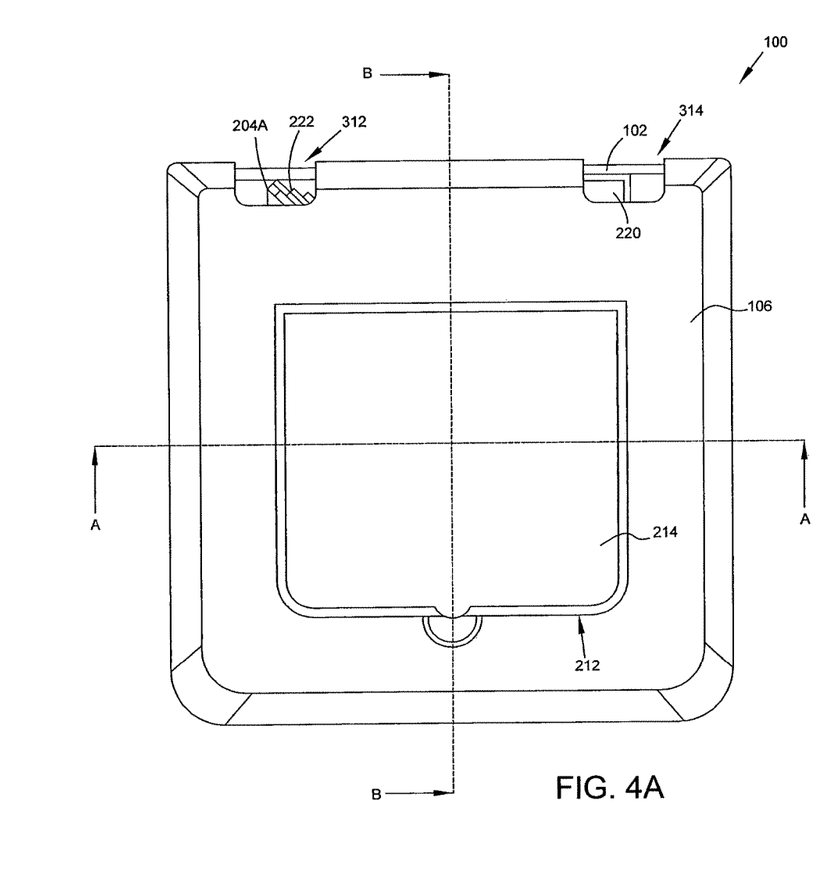
FIG. 4A is a top plan view of an aquarium, according to certain disclosed embodiments.
Figure 4B:
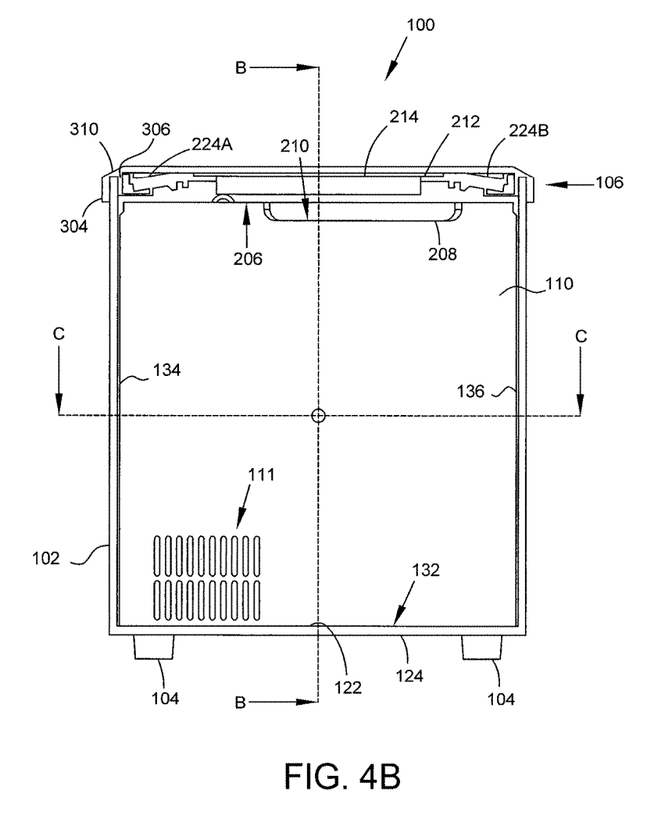
FIGS. 4B, 4C, and 4D are sectional views of an aquarium, according to certain disclosed embodiments.
Figure 4C:
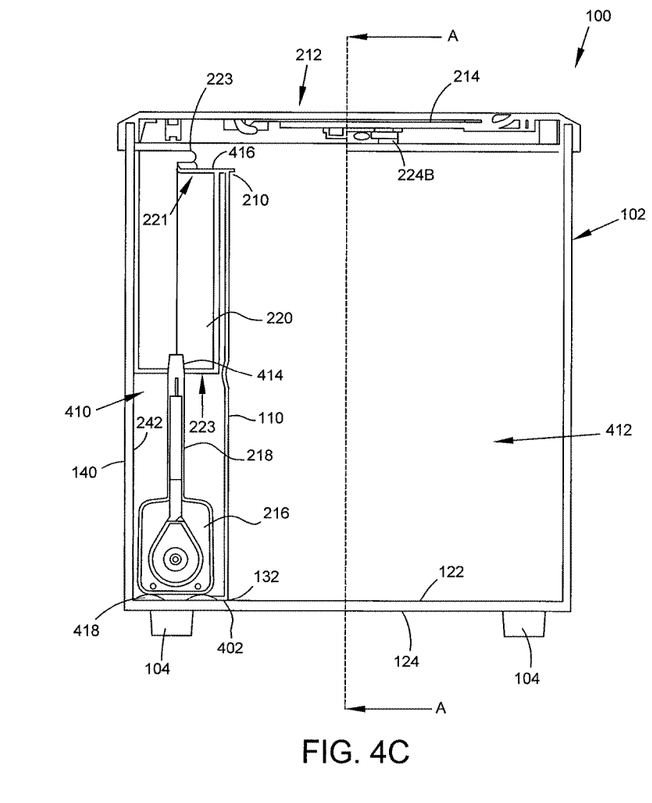

Referring to FIGS. 4A, 43, and 4C, lid 106 is dimensioned to removably receive open end 202 of tank 102 and to isolate an interior of tank 102 from a surrounding environment (while facilitating facilitate passage of electrical connectors 112 and 114 from the interior of tank 102 through pathways 312 and 314 to the external power source). For example, as shown in FIG. 4B, open end 202 of tank 102 may be positioned within groove 310, as established by edge 304 and lip 306, and may rest upon groove supports 308. In some aspects, groove supports 308 may support lid 306 when removably positioned onto open end 202 of lid 106.

Figure 4D:
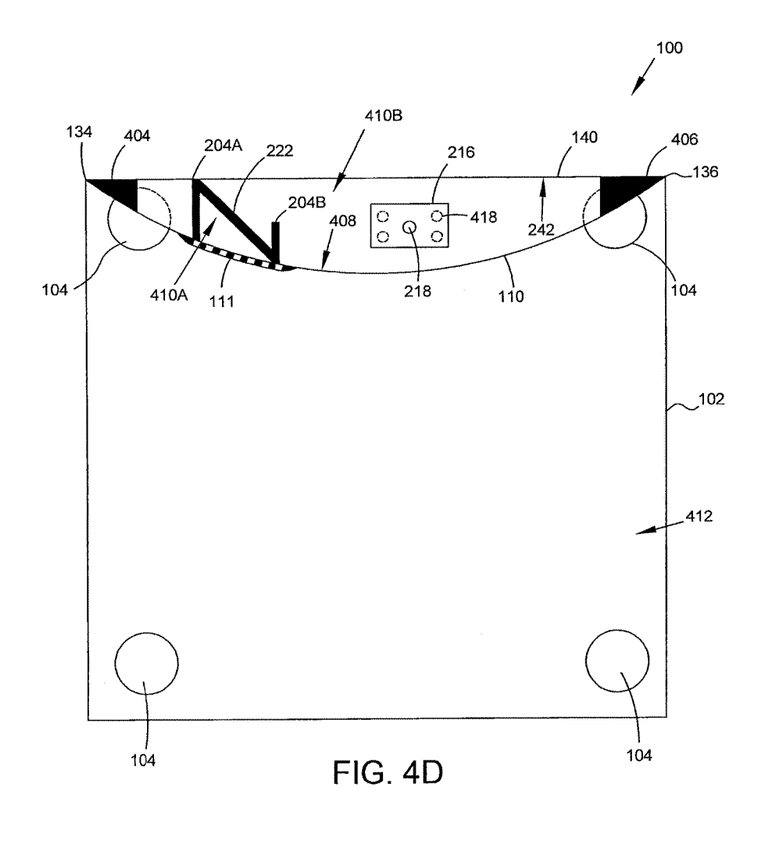

As further shown in FIGS. 4B, 4C, and 4D, filter housing 108 is positioned within the interior of tank 102, with the base plate (e.g., base plate 402 of FIG. 4C) being dimensioned to contact and engage a portion of bottom surface 122. As described above, base plate 402 may be an opaque thermoplastic material (or another opaque or transparent plastic, glass, acrylic, or other suitable material), and is attached to the corresponding portion of bottom surface 122 using any of the processes described herein.

In further aspects, sidewall 110 is dimensioned to contact portions of interior surface 242 of sidewall 140 along longitudinal edges 134 and 136 when filter housing 108 is positioned within the interior of tank 102. For example, sidewall 110 is connected to interior surface 242 of sidewall 140 through elongated connection members 404 and 406 disposed along respective ones of longitudinal edges 134 and 136. As shown in FIG. 4D, elongated connection member 404 is generally triangular in shape, includes a first surface dimensioned to engage a portion of an inner surface 408 of sidewall 110 along longitudinal edge 134, and a second surface dimensioned to engage a portion of inner surface 242. Similarly, elongated connection member 406 is also generally triangular in shape, includes a first surface dimensioned to engage an additional portion of inner surface 408 along longitudinal edge 136, and a second surface dimensioned to engage a portion of inner surface 242. Elongated connection members 404 and 406 are, in certain instances, constructed from an opaque, thermoplastic material, such as the material forming sidewall 110 and base plate 402 (or other similar opaque or transparent materials), and may be attached to corresponding portions of interior surfaces 242 and 408 using any appropriate technique, such as those described above.

As shown in FIGS. 4B, 4C, and 4D, filter housing 108 is fixedly positioned within the interior of tank 102 upon attachment of elongated connection members 404 and 406 to corresponding portions of interior surface 242 and to the corresponding portions of interior surface 408, and upon attachment of base plate 402 to the corresponding portion of bottom surface 122. In one aspect, a curvature of sidewall 110 is concave toward portions of interior surface 242 (e.g., as illustrated in FIGS. 1-3 and 4A-4D), although sidewalls consistent with the disclosed embodiments may exhibit other curvatures, varying curvatures, or no curvature. In some aspects, filter housing 108 encloses a first portion 410 of the interior of the tank 102 bounded by base plate 402, sidewall 110, and interior surface 242 of sidewall 140, and isolates first portion 410 from a second portion 412 of tank 102, as shown in FIGS. 4C and 4D. Further, and as described above, inlets 111 are positioned along first lateral edge 132 within a portion of sidewall 110 that is proximate to longitudinal edge 134 and are elongated in direction parallel to an axis of tank 102. In some instances, inlets 111 facilitate fluid communication between the first portion 410 and second portion 412 of tank 102.

Filter housing 108 is also dimensioned to removably receive and support filter cartridge 222, and the positioning of filter cartridge 222 within the hollow interior of filter housing 108 may partition enclosed first portion 410 into a first chamber 410A and a second chamber 410B (e.g., as separated by positioned filter cartridge 222). By way of example, filter cartridge 222 may include an elongated, planar base structure surrounded by a natural or synthetic filter material, and filter housing 108 includes filter support structures 204A and 204B positioned along an interior surface 408 of sidewall 110 and dimensioned to removably receive and support filter cartridge 222. The disclosed embodiments are, however, not limited this exemplary filter cartridge, and in further aspects, aquarium 100 may include filter cartridges having other shapes, formed from other materials, and/or supported within filter housing 108 by other support structures.

Further, pump 216 is removably positioned within second chamber 410B at a proximal end of filter housing 108, and in some instances, is disposed onto and supported by a portion of base plate 402. Although not depicted in FIGS. 4A-4D, pump 216 may be connected to the external power source by electrical connector 112, and may be supported on the portion of housing support structure 208 by one or more non-permanent support structures 418, which include, but are not limited to, suction cups or adhesives. Pump 216 also includes an input in fluid communication with second chamber 410B, and an output connected to a proximal end of elongated pipe 218, a distal end of which is connected to an inlet 414 of reservoir 220. As described above, reservoir 220 is dimensioned to be removably positioned within second chamber 408, and includes discharge lip 221 dimensioned to engage surface 210 of notch 208 and removably position reservoir 220 within filter housing 108.

Referring to FIG. 4C, and in certain embodiments, a surface 416 of discharge lip 220 may correspond to a discharge surface across which water discharges from reservoir 220 into second portion 412 of tank 102. For example, tank 102 stores a certain volume of water, and when reservoir 220 is removably positioned within filter housing 108 and discharge lip 221 engages with notch 208, surface 416 is disposed at a position above a surface of the stored water along a vertical axis of tank 102. In certain aspects, and upon connection of pump 216 to the external power source, pump 216 operates to mechanically draw the stored water from second portion 412 of tank 102, through inlets 111, into first chamber 410A of filter housing 108, and across filter cartridge 222 into second chamber 410B. Pump 216 further operates to mechanically pump the drawn and filtered water through elongated tube 218 and into reservoir 220 via inlet 414.

Reservoir 220 gradually and continuously fills with water during the operation of pump 216, and once a depth of the water in reservoir 220 is equivalent to a height of surface 416 above closed end 223 of reservoir 220, the water discharges across surface 416 into second portion 412 of tank 102. In some instances, the discharged water may cascade or pour across surface 416 into second portion 412 of tank 102, and discharge lip 220 may discharge the water across surface 416 at a flow rate that is substantially invariable over time. The flow rate includes, for example, a flow rate of twelve gallons per minute, which also corresponds to a rate at which pump 216 operates to mechanically draw and pump stored water into reservoir 216. The disclosed embodiments are, however, not limited to mechanical pumps exhibiting these exemplary flow rates, or to outlet structures and discharge lips characterized by planar discharge without curvature. In additional aspects, aquarium 100 may include mechanical pumps capable of drawings and pumping water at other appropriate flow rates, and outlet structures having other shapes, including an outlet structure having a curved discharge surface having multiple discharge locations.

In certain embodiments, the continuous discharge of water from reservoir 220 across the surface 416 of discharge lip 220 circulates filtered water through tank 102 at a rate sufficient to sustain fish and other aquatic life without establishing a hydrodynamic current within the tank. For example, certain fish, such as betta fish, thrive in low-current aquatic environments, and certain of the disclosed embodiments generate an aquatic environment within aquarium 100 that especially conducive to betta fish and similar aquatic life.

Although examples are illustrated and described herein, embodiments are nevertheless not limited to the details shown, since various modifications and structural changes may be made therein by those of ordinary skill within the scope and range of equivalents of the claims.

We claim:

1. An apparatus, comprising:
a tank having a closed end and an open end;
a filter housing comprising a base plate and a sidewall, the filter housing being disposed within an interior of the tank, and longitudinal edges of the sidewall being affixed to a surface of an interior sidewall of the tank to enclose a first portion of the tank, the sidewall comprising a plurality of inlets;
a filter cartridge dimensioned to be removably positioned between the sidewall and the surface of the tank sidewall, the filter cartridge partitioning the enclosed first portion of the tank into a first chamber and a second chamber, the first chamber being in fluid communication with a second portion of the tank through the inlets;
a pump disposed within the second chamber, the pump having an input in fluid communication with the second chamber, and an output connected to a proximal end of an elongated tube; and
a reservoir dimensioned to be removably positioned within the second chamber, the reservoir being connected to a distal end of the elongated tube and including an outlet that engages the sidewall, wherein:
the second portion of the tank stores water,
the pump operates to mechanically draw the water from the second tank portion into the first chamber through the inlets, and across the filter cartridge into the second chamber;
the pump operates to mechanically pump the drawn water through the elongated tube and into the reservoir; and
the reservoir discharges the pumped water into the second tank portion through the outlet.

2. The apparatus of claim 1, wherein:
the base plate is affixed to an interior surface of the closed end of the tank; and
the base plate is connected to the sidewall along a first lateral edge.

3. The apparatus of claim 2, wherein:
the outlet comprises a discharge lip;
the sidewall includes a notch disposed along a second lateral edge, the notch having a notch surface that is parallel to the base plate; and
the notch is dimensioned to removably receive and support the discharge lip.

4. The apparatus of claim 2, wherein:
a surface of the discharge lip is oriented parallel to the base plate;
along the axis of the tank, the surface of the discharge lip is disposed at a position above a surface of the water stored in the second tank portion; and
the pumped water and discharges across the surface of the discharge lip into the second portion of the tank.

5. The apparatus of claim 4, wherein the pumped water discharges across the surface of the discharge lip at a constant flow rate.

6. The apparatus of claim 4, wherein the pumped water discharges across the surface of the discharge lip at a flow rate of twelve gallons per hour.

7. The apparatus of claim 1, wherein:
the sidewall comprises first and second filter supports, the first and second filter supports being dimensioned to receive and support the filter cartridge; and
the filter cartridge is disposed between the first and second filter supports within the first portion of the tank.

8. The apparatus of claim 1, wherein the apparatus further comprises elongated structures disposed along the longitudinal edges of the sidewall, the elongated structures being in contact with the surface of an interior sidewall of the tank and a surface of the sidewall along the longitudinal edges, the elongated structures connecting the sidewall to the interior sidewall of the tank.

9. The apparatus of claim 1, further comprising a plurality of tank support structures affixed to an exterior surface of the closed end of the tank.

10. The apparatus of claim 1, wherein:
the sidewall comprises a curved sidewall; and
a curvature of the curved sidewall is concave toward the surface of the interior sidewall of the tank.

11. The apparatus of claim 1, further comprising a lid dimensioned to removably receive the open end of the tank, the lid comprising an aperture and an aperture cover.

12. The apparatus of claim 11, further comprising a lighting unit disposed on an interior surface of the lid, the lighting unit including lighting element that emits light illuminating the interior of the tank.

13. The apparatus of claim 1, wherein the filter housing is dimensioned to removably receive and support the pump, reservoir, and elongated tube within the second chamber, the pump being supported by the base of the filter housing.

14. A filtration system, comprising:
a filter housing comprising a base plate and a sidewall, the sidewall comprising a plurality of inlets, and longitudinal edges of the sidewall being in contact with a surface of an interior sidewall of a tank to enclose a portion of the tank;
a filter cartridge dimensioned to be removably positioned between the sidewall and the surface of the interior sidewall, the filter cartridge partitioning the enclosed first portion into a first chamber and a second chamber;
a pump disposed within the second chamber, the pump having an input in fluid communication with the second chamber, and an output connected to a proximal end of an elongated tube; and
a reservoir dimensioned to be removably positioned within the second chamber at a distal end of the filter housing, the reservoir being connected to a distal end of the elongated tube and including an outlet that engages the sidewall, wherein:
the pump operates to mechanically draw water into the first chamber through the inlets, and across the filter cartridge into the second chamber;
the pump operates to mechanically pump the drawn water through the elongated tube and into the reservoir; and
the reservoir discharges the pumped water through the outlet.

15. The filtration system of claim 14, wherein:
the outlet comprises a discharge lip;
the sidewall includes a notch disposed along a second lateral edge, the notch having a notch surface that is parallel to the base plate; and
the notch is dimensioned to removably receive and support the discharge lip.

16. The filtration system of claim 15, wherein:
a surface of the discharge lip is oriented parallel to the base plate; and
the pumped water discharges across the surface of the discharge lip.

17. The filtration system of claim 15, wherein the pumped water discharges across the surface of the discharge lip at a flow rate of twelve gallons per hour.

18. The filtration system of claim 14, wherein:
the sidewall comprises first and second filter supports, the first and second filter supports being dimensioned to receive and support the filter cartridge; and
the filter cartridge is disposed between the first and second filter supports.

19. The filtration system of claim 14, wherein the filter housing is dimensioned to removably receive and support the pump, reservoir, and elongated tube within the second chamber, the pump being supported by the base of the filter housing.

20. The filtration system of claim 14, wherein:
the first chamber is in fluid communication with a second portion of the tank through the inlets;
the second portion of the tank stores water;
along the axis of the tank, the surface of the discharge lip is disposed at a position above a surface of the water stored in the second tank portion;
the pump operates to mechanically draw the stored water from the second tank portion into the first chamber through the inlets, and across the filter cartridge into the second chamber; and
the reservoir discharges the pumped water into the second tank portion through the outlet.

* * * * *